(12) United States Patent
Weng (10) Patent No.: US 6,769,088 B1
(45) Date of Patent: Jul. 27, 2004

(54) SECTOR-CODING TECHNIQUE FOR REDUCED READ-AFTER-WRITE OPERATIONS

(75) Inventor: Lih-Jyh Weng, Shrewsbury, MA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/345,245

(22) Filed: Jun. 30, 1999

(51) Int. Cl.[7] .......................... G11C 29/00; G06F 13/00; G11B 5/09
(52) U.S. Cl. .......................... 714/766; 711/114; 360/53
(58) Field of Search .......................... 714/770, 6, 767, 714/758, 756, 779, 794, 720, 766, 784; 711/114; 360/47, 53

(56) References Cited

U.S. PATENT DOCUMENTS

| | | | | |
|---|---|---|---|---|
| 5,265,104 A | * | 11/1993 | Weng | 714/770 |
| 5,341,381 A | * | 8/1994 | Fuller | 714/6 |
| 5,357,509 A | * | 10/1994 | Ohizumi | 714/710 |
| 5,375,128 A | * | 12/1994 | Menon et al. | 714/770 |
| 5,379,305 A | * | 1/1995 | Weng | 714/770 |
| 5,388,013 A | * | 2/1995 | Nakamura | 714/779 |
| 5,623,595 A | * | 4/1997 | Bailey | 714/6 |
| 5,911,779 A | * | 6/1999 | Stallmo et al. | 714/6 |
| 6,023,780 A | * | 2/2000 | Iwatani | 714/770 |
| 6,148,430 A | * | 11/2000 | Weng | 714/770 |
| 6,223,323 B1 | * | 4/2001 | Wescott | 714/767 |
| 6,353,895 B1 | * | 3/2002 | Stephenson | 714/5 |
| 6,378,038 B1 | * | 4/2002 | Richardson et al. | 711/114 |

* cited by examiner

Primary Examiner—Albert Decady
Assistant Examiner—Matthew C. Dooley (57) ABSTRACT

A mechanism for providing error protection for data that is to be stored in a data storage system in which data are stored in data sectors in a data storage area and redundant information that provides error protection for the data are stored in redundant sectors in a redundant storage area. New data that is written to a designated one of the data sectors, and that is not error protected by the redundant information, is received, and error correction information for the new data is selectively stored in an additional storage area to provide error protection for the new data instead of revising the redundant information to provide such error protection.

51 Claims, 6 Drawing Sheets

SECTOR-CODING TECHNIQUE FOR REDUCED READ-AFTER-WRITE OPERATIONS

BACKGROUND OF THE INVENTION

The invention relates generally to data storage systems which use error correction codes to protect stored data from loss.

Error correction codes (ECC's) are often employed in data storage systems to detect and correct data corrupted as a result of a media defect. Before a string of data symbols is recorded, it is encoded to generate redundancy symbols. The redundancy symbols are appended to the data symbols to form code words. When the code words are retrieved from data storage devices, the code words are decoded to detect and, if possible, correct any errors in the data. This decoding is accomplished through manipulation of the redundancy symbols.

Data may be encoded using an (n,k) D distance Reed-Solomon code to protect data stored on k data sectors of k data storage devices using n–k (or "r") redundant sectors of r redundant drives. When new data words are received for storage in designated sectors of the data storage devices, the redundancy information stored in corresponding sectors of the redundant drives is updated in order to provide error protection to the new data words. That is, when the new data words are stored in a designated data sector on a particular data storage device, such as a disk drive, the data words stored in the same sector location on each of the k–1 other data drives are retrieved. An encoder encodes, using a Reed-Solomon code, the corresponding symbols from each of the k–1 retrieved data words and the new data, and generates for each set of k symbols r redundancy symbols. The encoder thus encodes the first symbols from each of these words and generates a first set of r redundancy symbols, and next, encodes the second symbols from each of these words and generates a second set of r redundancy symbols, and so forth. Each set of r redundancy symbols and the associated k encoded symbols together form a Reed Solomon code word. This level of encoding is referred to as sector coding. The various sets of r redundancy symbols are written to the r redundant sectors, by writing one redundancy symbol from each set, that is, one symbol from each code, on each redundant sector.

If an error occurs in a sector or the drive on which the sector resides fails, the lost or erroneous data stored thereon can be regenerated using the associated Reed-Solomon code words. The data and redundancy symbols which form the associated code words are retrieved from the other sectors or drives. A decoder then manipulates the code words, using conventional error correcting techniques, to produce the otherwise lost symbols. A (n,k) Reed Solomon code of distance D can regenerate symbols even if errors or failures occur in up to D–1 sectors or drives simultaneously.

Although the above-described redundancy technique is quite robust, it requires extensive, time-consuming "read-after-write" operations. That is, each write operation requires that corresponding symbols from each of the data sectors be retrieved so that the retrieved symbols and the symbols to be recorded can be encoded to generate new redundancy symbols.

Another prior approach, described in U.S. Pat. No. 5,265,104, in the name of Lih-Jyh Weng, reduces the number of read-after-write operations by allowing a data storage system to perform up to $[(n-k)/2]-1$ write operations before it retrieves and encodes the corresponding data code word symbols, along with the new data to be recorded, to generate new redundancy symbols. The protection of the re-written data is maintained by recording a copy of that data over redundant symbols on a redundant sector. Consequently, each such write operation introduces two erasures (i.e., errors with known locations) to the code. While this coding scheme requires fewer retrieval and encoding steps, it loses some error correction capacity for each write operation performed without the retrieval and encoding steps. That is, the effective distance of the code is reduced by two during each write operation which writes new data to both a data sector and a redundant sector.

SUMMARY OF THE INVENTION

This invention features an efficient way of providing error protection for data that is to be stored in a data storage system of the kind in which data are stored in data sectors in a data storage area and redundant information that provides error protection for the data are stored in corresponding redundant sectors in a redundant storage area.

In one general aspect of the invention, new data that is written to a designated one of the data sectors, and that is not error protected by the redundant information, is received, and error correction information for the new data is selectively stored in an additional storage area to provide error protection for the new data instead of revising the redundant information to provide such error protection.

Embodiments of the invention may include one or more of the following features.

The selective storing of the error correction information may include determining if the error protection provided by the redundant information is sufficient to enable error correction of data in other data sectors if the redundancy information is not revised. Such determination may include determining if the additional storage area has enough capacity to store the error correction information. If it is determined that the additional storage area does not have enough capacity to store the error correction information, then the redundant information is revised. The redundant information is revised in a sector encoding operation.

The additional storage area may include a plurality of additional sectors. Determining if the additional storage area has enough capacity may include the following: determining if the designated data sector has been written since a previous sector encoding; and if the designated data sector has not been written since the previous sector encoding, determining how many other ones of the data sectors have been written since the previous sector encoding.

The selective storing may further include storing the error correction information on an available sector in the additional storage area if the number of other ones of the data sectors written since the previous sector encoding is less than the number of sectors in the additional storage area. The previous sector encoding corresponds to the last sector encoding operation in which the redundant information was generated from the data in the data sectors.

The selective storing may further include revising the redundancy information if the number of other ones of the data sectors written since the previous sector encoding is not less than the number of sectors in the additional storage area. The revising of the redundancy information may include performing a sector encoding to regenerate the redundant information in the redundant sectors by encoding the data in the data sectors and the new data stored in the additional storage area.

The error correction information stored in the additional storage area may include error correction code (ECC) associated with the new data. That error correction information may further include a copy of the new data.

Alternatively, a first portion of error correction code associated with the new data may be stored in the designated data sector and the error correction information may include a remaining second portion of error correction code associated with the new data. If the data sectors each store a Reed Solomon code word of k data symbols and r ECC symbols, the r ECC symbols being generated by symbol encoding the data, then the length of the first portion of the error correction code associated with the new data may be a first number of ECC symbols and the length of the remaining second portion of error correction code associated with the new data may be a second number of ECC symbols equal to r minus the first number of ECC symbols.

The redundant sectors can have redundant symbols and the corresponding data symbols in the data sectors and associated redundant symbols in the redundant sectors may form Reed Solomon code words of k data symbols and r redundant symbols.

The number of additional sectors in the plurality of additional sectors in the additional storage area may be selected as r–2.

The symbol size used by the sector encoding and the symbol encoding may be different.

The coding mechanism of the invention offers several advantages. It increases the overall reliability of disk sectors using sector encoding while reducing the frequency of read-after-write operations required by sector coding. Because the use of r' (i.e., r–2) additional sectors in the additional storage area reduces the number of erasures per write operation to one, the choice of r' reduces the frequency of read-after-write operations required by a sector encoding operation to at least half of that of prior techniques that overwrite redundant sectors with data. That is, r' writes of new data may be performed without revising the redundant sectors if error correction information is written to r' sectors in the additional storage area. Additionally, because sector encoding is used, an ECC within a sector can be selected to be weaker than it could be without sector coding. Therefore, the ECC complexity within a sector is reduced.

Other features and advantages of the invention will be apparent from the following detailed description and from the claims.

DETAILED DESCRIPTION

Figure 1:
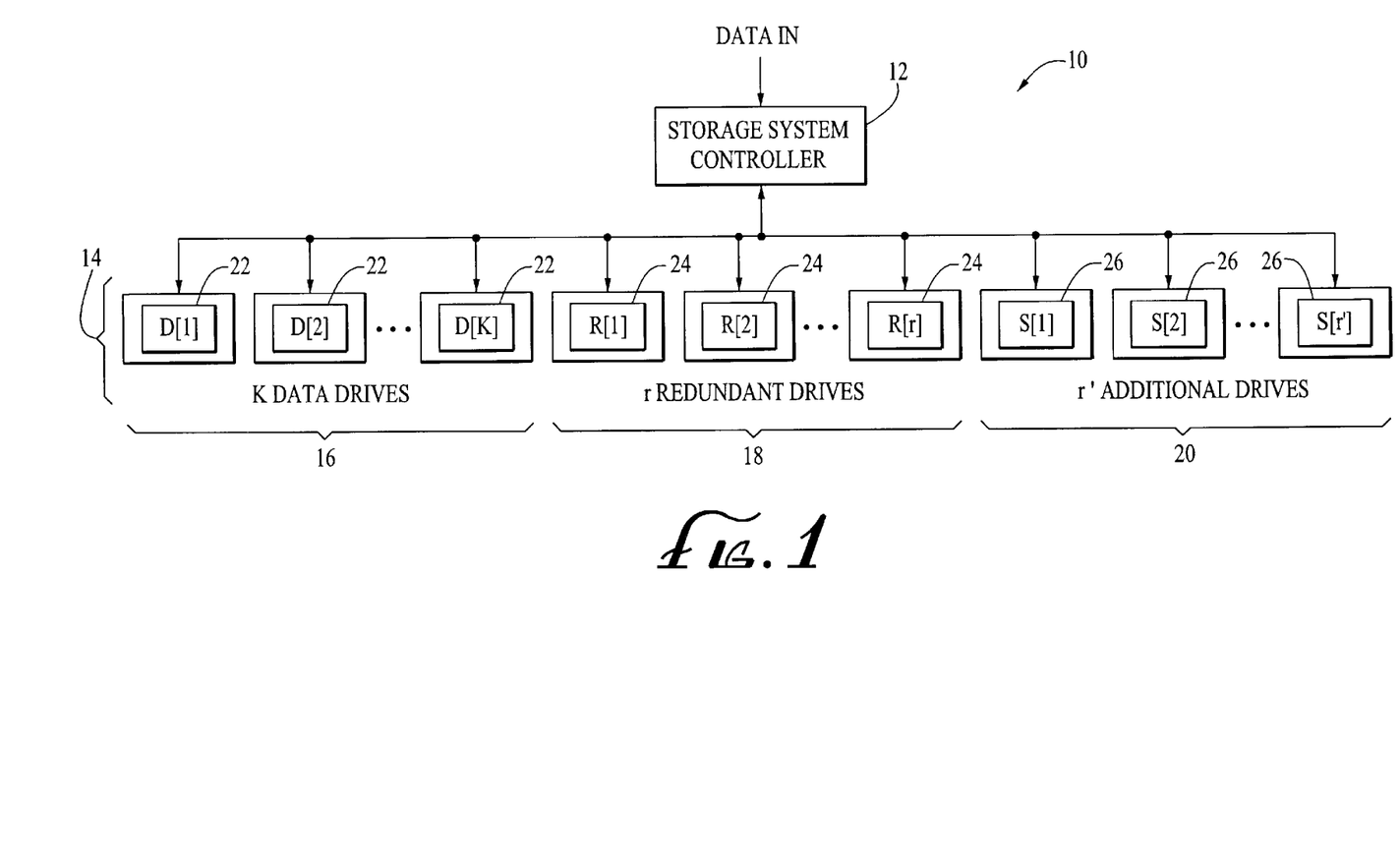
FIG. 1 is a block diagram of a data storage system which includes storage for redundant sectors as well as additional storage for copies of sector data and ECC.

Referring to FIG. 1, a data storage system 10 consisting of a storage system controller 12 coupled to storage devices 14 is shown. The storage devices 14 include a data storage area shown as plurality of data storage devices 16, a redundant storage area shown as plurality of redundant storage devices 18 and an additional storage area shown as a plurality of additional storage devices 20. In the illustrated embodiment, the data storage devices 16 store data encoded by (n,k) distance D Reed-Solomon encoding. Accordingly, there are k data storage devices 16 and r redundant storage devices 18. The number of additional storage devices is selected to be r–2 (hereinafter, "r'"). The storage devices are shown as drives. The drives include storage media divided into tracks, each track divided into sectors, according to known formatting techniques. Thus, each drive includes a plurality of sectors, some used to store data and/or associated error correction code (ECC) which provides error protection to the data. For simplicity, each of the drives is illustrated as including one such sector. Each data drive 16 therefore includes a data sector D[i] 22, where D[i] corresponds to the same sector location in each of the k data drives. Each r redundant drive 18 includes a redundant sector R[i] 24. Each of the r' additional drives includes an additional sector S[i] 26. Although shown as residing on separate drives, it will be recognized that the additional sectors and the data sectors may reside on the same drive. Preferably, each of the data, redundant and additional sectors is placed on a separate drive to provide maximum redundancy in the event of a drive failure.

Figure 2:
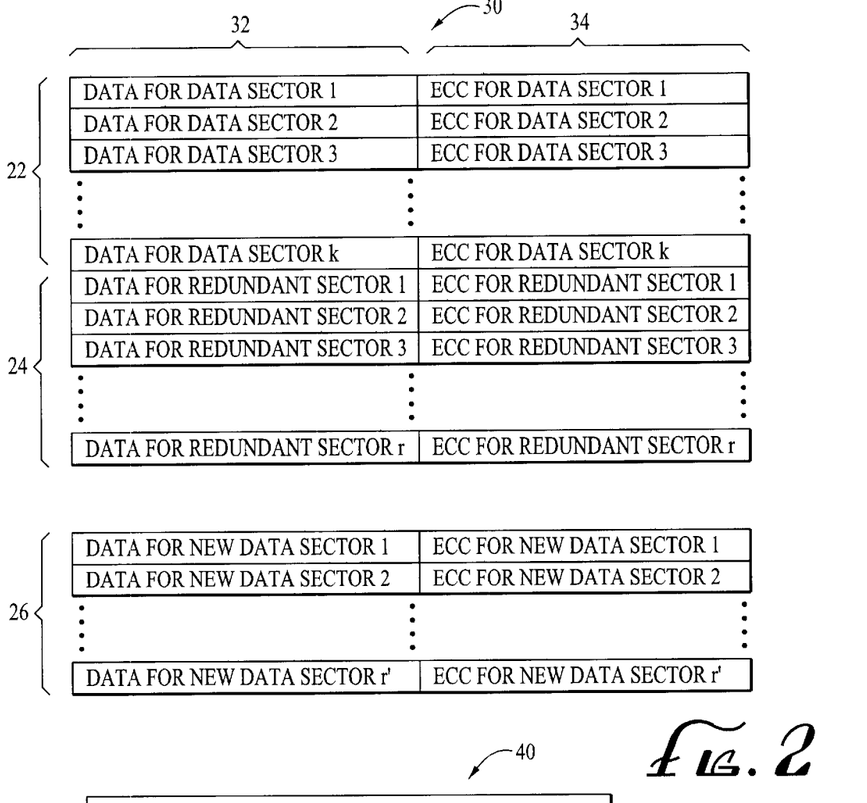
FIG. 2 is a conceptual organization of the sectors (of FIG. 1) related by Reed-Solomon sector and symbol coding schemes.

Referring to FIG. 2, a conceptual depiction of the sector code organization 30 of the sectors in the storage devices 14 of FIG. 1 is shown. Each of data sectors D[i] 22, redundant sectors R[i] 24 and additional sectors S[i] 26 includes a data portion 32 and an error correction code (ECC) portion 34. Specifically, D[1], D[2], . . . D[k] store in their respective data and ECC portions k data code words (or symbols) and associated n-k ("r") ECC symbols, respectively. In a corresponding storage location, each of the redundant sectors R[i] stores in the data portion redundant information in the form of redundant (or redundancy) symbols which relate to the corresponding data symbols in the k data drive sectors D[i]. The redundant symbols in each redundant sector R[i] are also error protected by ECC symbols in the ECC portion 34.

Collectively, the symbols in the data portions and the ECC portions in each sector of the D[i] and R[i] sectors form an n-symbol Reed-Solomon code word. The storage system controller 12 (FIG. 1) generates the redundant symbols of the data portion 32 for redundant sectors R[i] by encoding the corresponding data symbols from each of the k data drives using an (n,k) distance d Reed-Solomon code. The symbols stored in the corresponding storage locations on each of the data and redundant sectors, that is, the "i"th symbols stored in the k data sectors, and the "i"th symbols stored in the r redundant sectors, also form n-symbol Reed-Solomon code words.

The r' additional sectors S[i] 26 are used by storage system controller 12 to mitigate the frequency with which the r redundant sectors R[i] 24 must be updated because of changes to the data stored on the data sectors D[i] 22. It will be appreciated by those skilled in the art that data sector data modified since a previous sector encoding operation is no longer error protected by the code words formed by the corresponding data symbols and redundant symbols because the modified or new data no longer contributes to those code words. To provide a level of error protection comparable to those code words, the storage system controller 12 selectively stores error correction information related to new data sector data on the additional sectors S[i] 26 instead of revising the redundant sectors R[i] 24. In the illustrated embodiment, and as further described below, the storage system controller 12 allows r' different data sectors D[i] 22 to be re-written before the redundant sectors R[i] are revised by a sector encoding operation.

In the embodiment illustrated in FIG. 2, the r' additional sectors 26 also have the data and ECC portions for storing error correction information in the form of copies of the data sectors 22, as will be described. The storage system controller 12 performs r' consecutive write operations by recording the data code words in designated data sectors D[i] on a designated data drive 16 and, at the same time, recording a copy of the data code words in corresponding sector storage locations S[i] in a designated additional drive 20. The storage system controller 12 can perform this type of write operation in the same amount of time that it can perform a write operation directed only to a data drive because it can simultaneously send the same data to each of the drives 16, 20.

Referring again to FIGS. 1 and 2, "r'" corresponds to the maximum (threshold) number of writes to different data sectors which may occur between sector-encoding operations. In the described embodiment, the maximum value of r' is selected as r−2 to ensure that the sector error rate for the n−r' sectors with r−r' redundant sectors is less than the sector error rate of a rewritten sector D[i] (protected by additional sector S[i]). For r'=r−2, the code can tolerate as many as r−2 "erasures" (i.e., errors with known locations) produced by overwriting a data sector with new data. More that this number of erasures results in a code that is too weak to provide a sufficient level of error protection.

Figure 3:
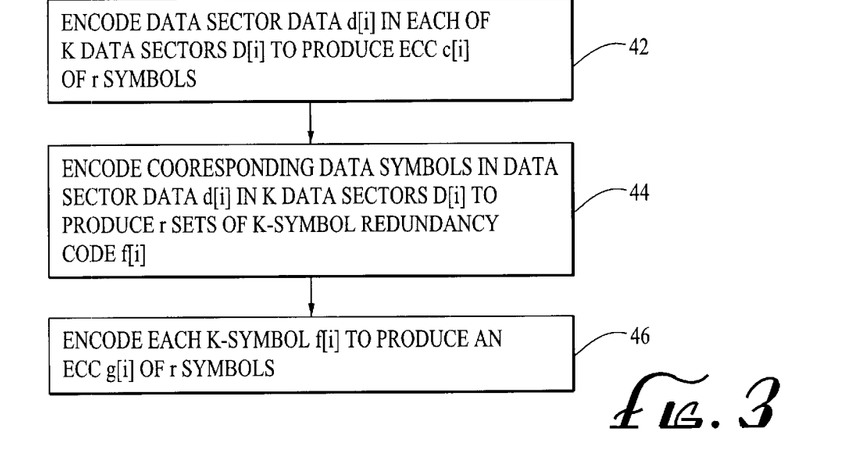
FIG. 3 is a flow diagram of a sector and symbol encoding process for encoding the data sectors shown in FIG. 1.

Referring to FIG. 3, an encoding process 40 for encoding data symbols stored in the data portions 32 of the data sectors D[1], D[2], . . . , D[k](from FIG. 2) is shown. For each data sector data d[i] of k data symbols, a corresponding r-symbol ECC e[i] is computed and stored in the ECC portion for that data sector (step 42). This first type of encoding will be referred to herein as "horizontal" or symbol encoding, that is, the encoding of symbols within a given sector i. Once each data sector has been individually encoded, the encoding process retrieves the jth symbols of data sector data d[1], d[2], . . . , d[k], which can be denoted as d[1,j], d[2,j], . . . , d[k,j], respectively, and encodes each of d[1,j], d[2,j], . . . , d[k,j] to produce redundant symbols f[1,j], f[2,j], . . . , f[r,j] (step 44). This second type of encoding is referred to as "vertical" or sector encoding. Each set of redundant symbols f[j,1], f[j,2], . . . , f[j,k] are grouped together (horizontally) to form a k-symbol redundancy code f[i], and f[i] is stored in the data portion of a corresponding redundant sector f[i] (where i=j) as it is encoded. For example, the ECC symbols f[1,1], f[1,2], . . . , f[1,k] are grouped together to form f[1], the ECC symbols f[2,1], f[2,2], . . . , f[2,k] are grouped together to form a second redundancy code f[2], and so forth, until the f[i] redundancy codes f[1] through f[r] have been generated. Once the vertical encoding is complete, the encoding process computes for each f[i] an ECC g[i] of r symbols—again, using horizontal encoding (step 46). The computed ECC g[i] is stored in ECC portion of the corresponding redundant sector S[i]. It should be noted that the horizontal encoding of the data portions of both the data and redundant sectors uses the same Reed-Solomon code; however, the vertical coding may be different. For instance, the vertically and horizontally generated codes need not use the same symbol sizes, as will be discussed. Additional details of sector encoding are provided by the earlier mentioned U.S. Pat. No. 5,265,104, incorporated herein by reference.

Figure 4:
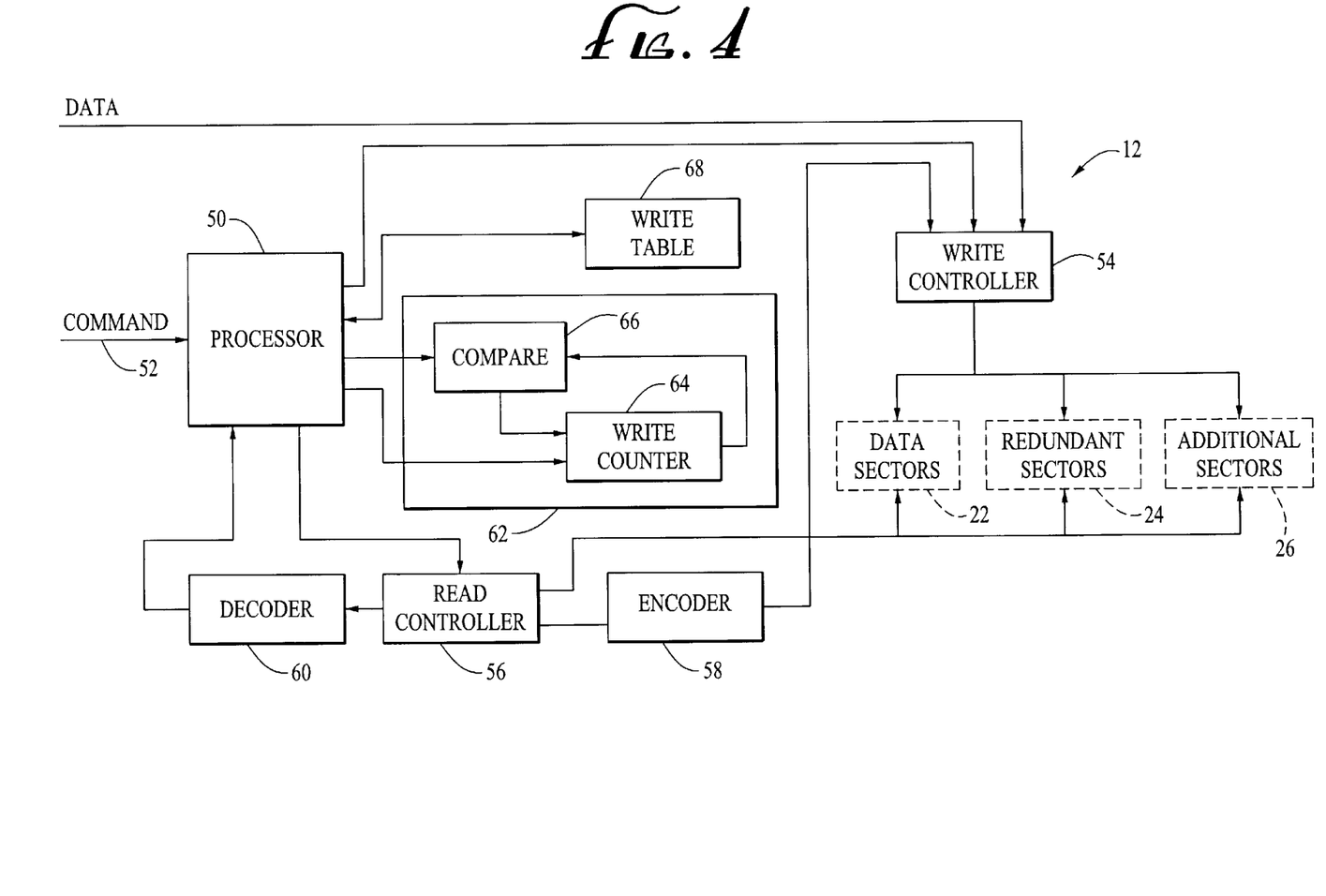
FIG. 4 is a block diagram of the system controller shown in FIG. 1.

Referring to FIG. 4, the storage system controller 12 (FIG. 1) includes a processor 50, which receives host write commands or instructions to perform a write operation over a command line 52. The storage system controller 12 further includes a write controller 54 and a read controller 56 for writing to and reading from the sectors 22, 24, 26 (shown in dashed lines), respectively, at the direction of the processor 50. The write controller 54 receives data to be written to the sectors from an external processor or host.

Further included is an encoder 58 and a decoder 60. The encoder 58, which is coupled to the read controller 56 and the write controller 54, receives data read by read controller 56, encodes the read data to produce ECC, and transfers the resulting code to the write controller 54. The decoder 60, which is connected to the read controller 52 and the processor 50, performs the reverse operation on encoded data retrieved from the sectors 22, 24, 26 by the read controller 56 and sends decoded data words to the processor 50 (or, alternatively, directly to an external host).

The processor 50 is also connected to circuitry for maintaining a current sector write (between encoding operations) count 62, implemented as a write counter 64 and a comparator 66 for comparing the count to a threshold r'. As mentioned earlier, the value of r' is chosen to be r−2.

Also coupled to the processor is circuity for maintaining data sector re-write status as well as a data sector-to-additional sector mapping. This circuitry is implemented as a write table 68, which stores information identifying any data sectors to which a write operation has been directed since the last sector encoding operation. The write table 68 may, for example, consist of k memory locations for each corresponding sector location, with each memory location being addressed by the information identifying the sector. The memory locations either store all zeros, if the identified sector has not been involved in a write operation, or information identifying a corresponding additional sector.

Figure 5:
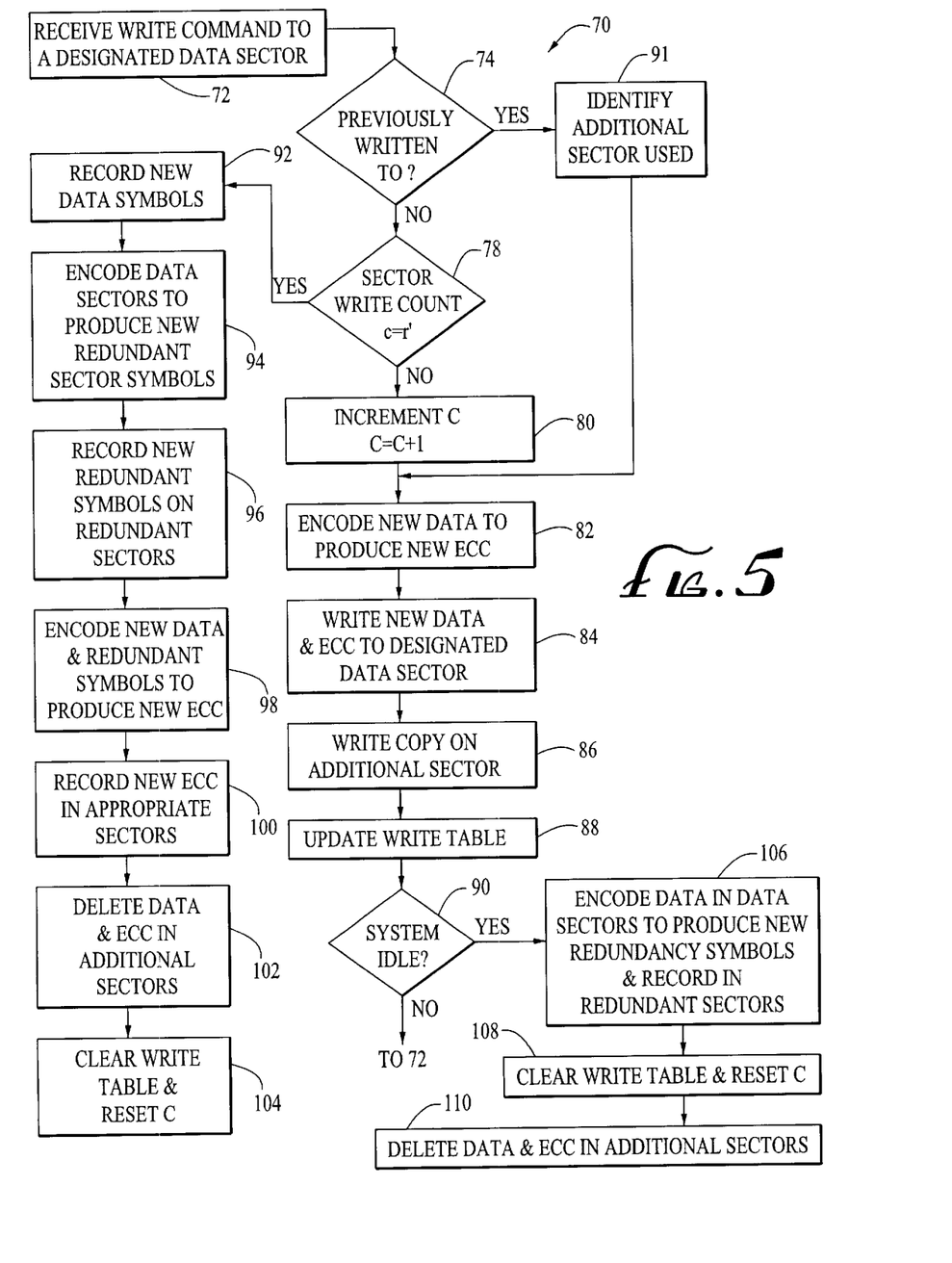
FIG. 5 is a flow diagram of a write operation for modifying encoded data stored in a data sector.

A write operation 70 for writing data to sectors previously written and encoded as described above is shown in FIG. 5. Referring to FIG. 5 in conjunction with FIG. 4, the processor 50 receives on the command line 52 write commands or instructions to perform a write to a designated data sector (step 72). The processor 50 consults the write table 68 for information corresponding to the data sector to which the write operation is directed, for example, data sector d[3], and determines from the write table 68 if that particular sector has been involved in a write operation since the previous encoding (step 74). If it has, the processor 50 again checks the write table to determine which additional sector S[i] was involved in that write operation (step 76). If the designated sector has not been involved in a write operation, the processor 50 directs the comparator 66 to compare a current sector write count c to the value r' (step 78). It will be recalled that r' is the number of additional sectors for storing copies of data code words d[i] and corresponding ECC e[i]. If the count c is less than r', which indicates fewer than r' of the corresponding sectors have been overwritten, the comparator sends to the counter 64 a signal which increments the counter by one, i.e., c=c+1 (step 80). The processor 50 directs the encoder 58 to compute e[i] for the new data (step 82) and directs the write controller 54 to overwrite the designated data sector data, such as d[3], and its associated ECC e[3] with the new data sector data d'[3] and computed ECC e'[3] (step 84). The write controller records a second copy of d'[3] and e'[3] in an unused one of the additional sectors S[i] (step 86). Because there are now two identical copies of the new data code word and ECC, the sector error rate of the designated data sector is made comparable to the data sectors which have not been re-written. The status and data sector-to-additional sector mapping is updated in the write table 68 for the re-written data sector D[3] (step 88) to reflect that D[3] has been modified and that a previously unused sector S[i] now stores a copy of the modified data. If the processor 50 has queued another write command, it begins another write operation. Otherwise, the processor 50 becomes idle (step 90).

If, at step 74, the designated data sector is identified by the write table 68 as having been involved in a previous write operation (since the last encoding process), the processor 50 determines from the write table 68 which additional sector was involved in that write operation (step 91). The write controller 54 performs steps 82, 84 and 86, and updates the write table (step 88). In this instance, the write table is updated for the mapping only, as the status of the data sector is unchanged.

If the step 78 identifies that the sector write count c equals r', the processor 50 directs the write controller 54 to record the new data on the designated data sector (step 92) and directs the read controller 56 and write controller 54 to work with the encoder to perform retrieval and encode operations (step 94). The read controller 56 retrieves from the corresponding sectors the k data code words. It then sends retrieved data sector data d[i] to the encoder 58 for vertical encoding as described above. The encoder 58 transfers the redundant symbols to the write controller 54, which records the redundant symbols on the r redundant sectors (step 96). The encoder 58 then encodes the data portion of the designated data sector and the redundant sectors to produce new ECC (step 98), which is written to the corresponding sectors D[i], R[i] by the write controller 54 (step 100). The processor 50 deletes any data and ECC stored in the additional sectors (step 102) as well as resets the write counter 64 and clears the write table 68 (step 104).

If the processor 50 is idle after performing the write operation (step 90), it directs the read controller 56, encoder 58 and write controller 54 to perform the retrieval, encoding and recording steps associated with producing and recording new redundant symbols and associated ECC (step 106). When this sector encoding is complete, the processor 50 resets the write counter 64 and clears the write table 68 (step 108). Optionally, any data and associated ECC stored in the r' additional sectors S[i] are deleted (step 110). Thus, all r' sectors are again available for use. The new set of redundant sectors can be constructed by using the information from the data sectors and rewritten data sectors D[i].

In the event that there are errors in the data sectors protected by the r redundant sectors, these errors can be recovered by an error and erasure correction decoding algorithm. The sectors being rewritten and the sectors containing errors are both treated as erasures.

Figure 6:
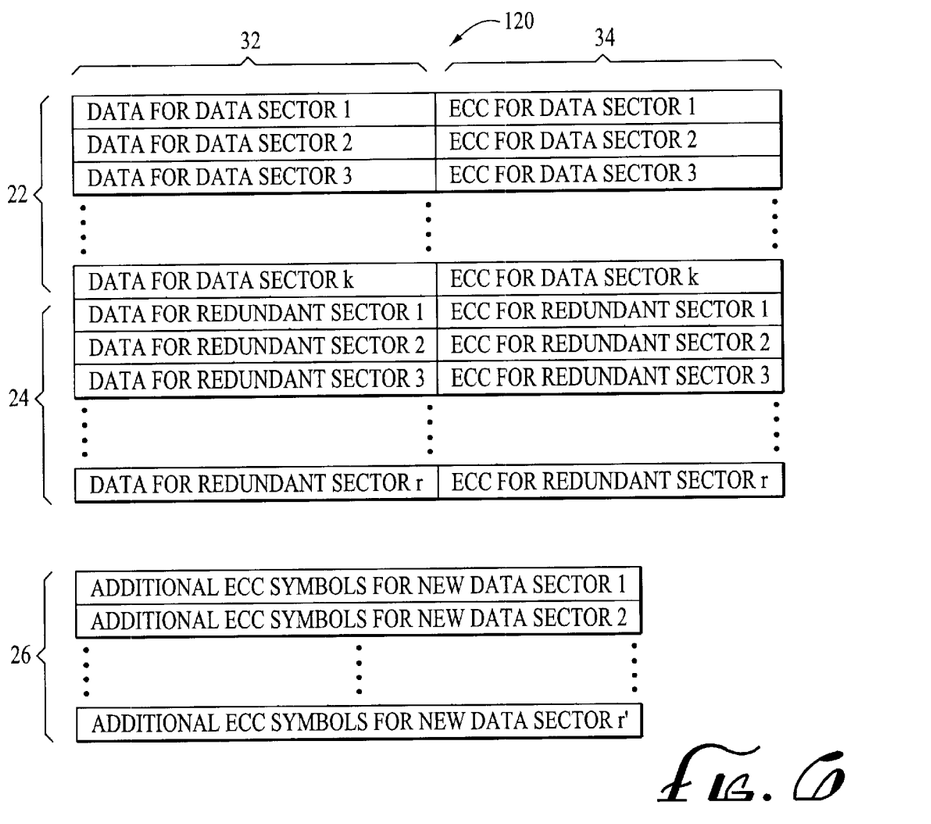
FIG. 6 is a conceptual organization of sectors related by an alternative sector and symbol coding scheme.

Other embodiments are contemplated. For example, referring to FIG. 6, a conceptual depiction of an alternative sector code organization 120 is shown. Like the above described sector code organization, the r redundant sectors 24 and k data sectors 22 are related by a Reed-Solomon code. In contrast to the data sector ECC 34 of FIG. 3, each data sector's ECC 34 in the sector coding scheme of FIG. 6 is made up of only a portion of the total number of symbols generated by the symbol coding. That is, a first portion of the ECC symbols associated with (i.e., computed for) data in a given data sector are stored in the data sector and a remaining second portion of the associated ECC symbols is discarded. When a data sector is re-written, the new data is protected by an ECC that is more powerful than the ECC used to encode before any re-write is performed. Given a first number "s" of ECC symbols corresponding to the originally stored ECC, the total number of ECC symbols for the re-written sector is "s'" where s'>s. However, only s of the s' symbols are attached to the new data to be rewritten. These s ECC symbols and the new data are written as a data sector. The a second number s'-s of ECC symbols corresponding to the remaining second portion of the ECC symbols (i.e., error correction information for the new data) is written to an unused one of the additional sectors r'. Thus, a set of r' additional sectors 26 are used to store only the additional ECC symbols, that is, the remaining second portion of the ECC (for a re-written data sector D[i]).

Figure 7:
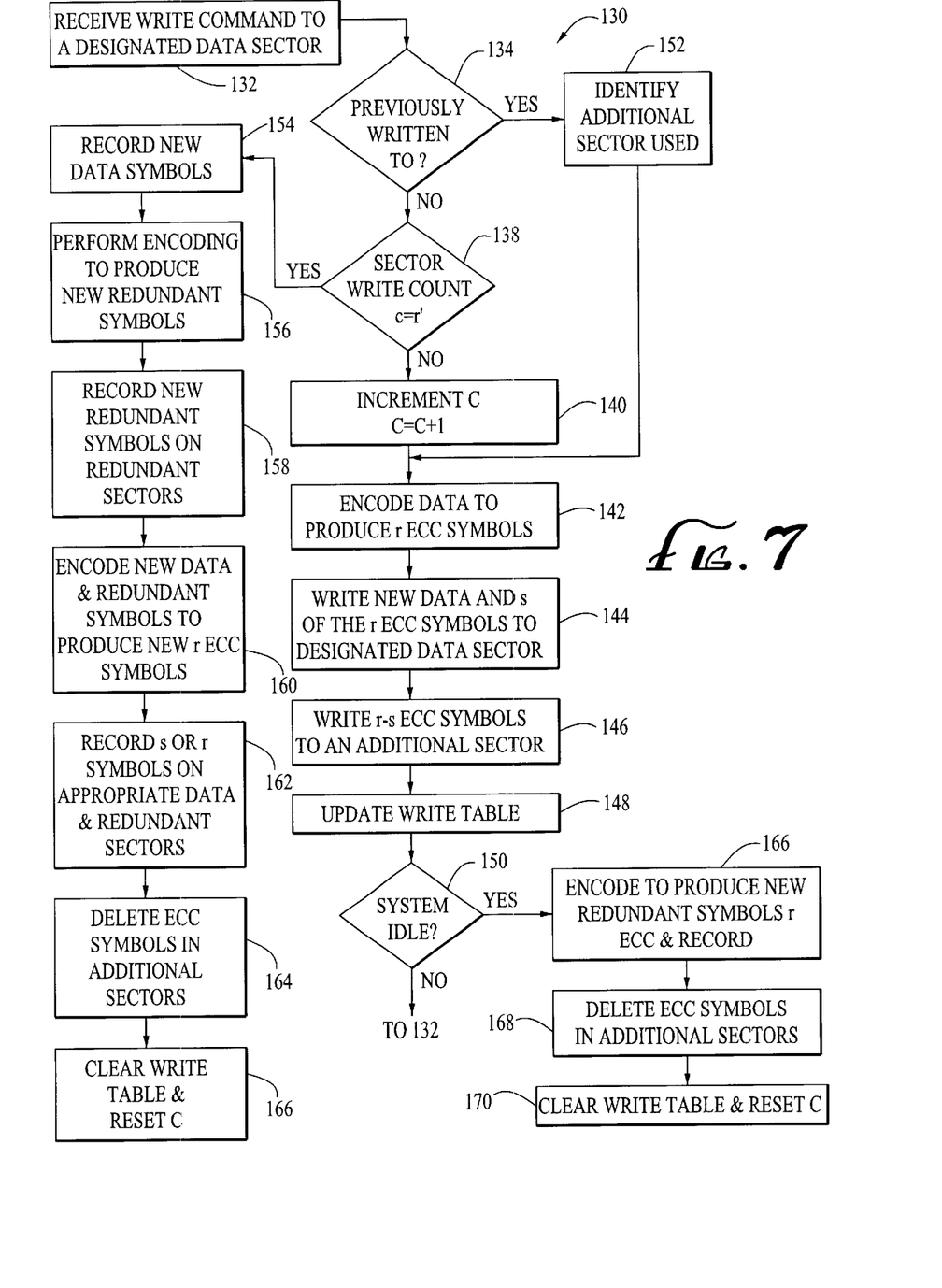
FIG. 7 is a flow diagram of a write operation for modifying encoded data stored in a data sector shown in FIG. 6.

A write operation 130 for writing data to sectors previously written and encoded according to FIG. 3 is shown in FIG. 7. Referring to FIG. 7 in conjunction with FIG. 4, the processor 50 receives on the command line 52 write commands or instructions to perform a write to a designated data sector (step 132). The processor 50 consults the write table 68 for the data sector to which the write operation is directed and determines if that particular sector has been involved in a write operation since the previous encoding (step 134). If the designated sector has not been involved in a write operation, the processor 50 directs the comparator 66 to compare a current sector write count to the value r' (step 138). If the count c is less than r', which indicates fewer than r' of the corresponding sectors have been overwritten, the comparator 66 sends to the counter 64 a signal which increments the counter by one, i.e., c=c+1 (step 140). The processor 50 directs the encoder 58 to compute ECC of r symbols for the new data (step 142) and directs the write controller 54 to overwrite the designated data sector with the new data and s symbols of the associated s'-symbol ECC (step 144). The write controller 54 records ECC symbols s'-s in an unused one of the additional sectors S[i] (step 146). The status and data sector-to-additional sector mapping is updated in the write table 68 for the re-written data sector (step 148) to reflect that the data sector has been modified and that a previously unused additional sector S[i] now stores an additional portion of the ECC. If the processor 50 has queued another write command, it begins another write operation. Otherwise, the processor 50 becomes idle (step 150).

If, at step 134, the designated data sector is identified as having been involved in a previous write operation (since the last encoding process), the processor 50 determines from the write table 68 which additional sector was involved in that write operation (step 152). The write controller 54 performs steps 142, 144 and 146, and updates the write table 68 (step 148). In this case, the write table 68 is update for the mapping only, as the status of the data sector is unchanged.

If the step 138 identifies that the sector write count c as being equal to r', the processor 50 directs the write controller 54 to record the new data on the designated data sector (step 154) and directs the read controller 56 and write controller 54 to work with the encoder 58 to perform retrieval and encode operations to produce new redundant symbols in the redundant sectors (step 156). The read controller 56 retrieves from the corresponding sectors the k data code words. It then sends retrieved data sector data d[i] to the encoder 58 for vertical encoding as described above. The encoder 58 transfers the redundancy symbols to the write controller 54, which records the redundant symbols on the r redundancy sectors R[i] (step 158). The encoder 58 then encodes the data portion of the designated data sector and the redundant sectors to produce new ECC of r symbols (step 158), s of which are written to the corresponding D[i] and R[i] sectors by the write controller 54 (step 160). Optionally, the processor 50 deletes any ECC stored in the additional sectors S[i](step 162). The processor 50 also resets the write counter 64 and clears the write table 68 (step 164).

If the processor 50 is idle after performing the write operation (step 150), the processor 50 directs the read controller 56, encoder 58 and write controller 54 to perform the retrieval, encoding and recording steps associated with producing new redundant symbols and associated ECC (step 166). Optionally, when this sector encoding is complete, any ECC symbols stored in the r' additional sectors may be deleted (step 168). Again, the processor 50 resets the write counter 64 and clears the write table 68 (step 170).

Figure 8:
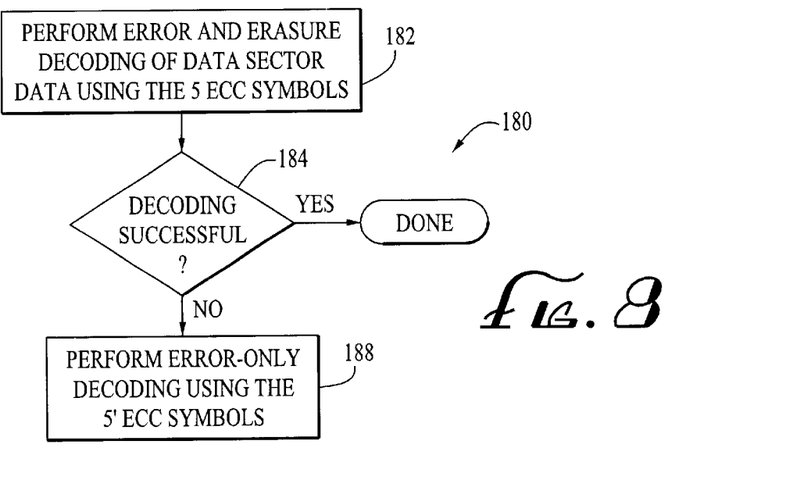
FIG. 8 is a flow diagram of a decoding process for decoding data sector data stored and coded in the manner illustrated in FIGS. 6 and 7.

If there are errors in a rewritten data sector protected by the s ECC symbols in the data sector and s'-s symbols in a additional sector, these errors can be recovered by an error- and-erasure decoding algorithm. Referring to FIG. 8, a decoding process 180 for decoding a re-written data sector having an ECC of s symbols includes applying an error- and-erasure decoding operation to a rewritten data sector D[i] using only the s ECC symbols (step 182). That is, it treats the s'-s additional ECC symbol locations as erasures. If the decoding is successful (step 184), the decoding process is complete (step 186). If the decoding fails, the decoding process retrieves the additional s'-s ECC symbols stored in an associated additional sector and performs an error-only decoding operation using the entire s'-symbol ECC to produce a decoded word (step 188). Because s'-s is usually very small in comparison to the total number of symbols in a sector, this technique is more efficient than that described with reference to FIGS. 3–5. However, if the additional sectors are located on the data drives, then those drives must have the ability to write at least two different sector sizes. In such an implementation, it is preferable to store the additional s'-s ECC symbols in sectors on a few pre-designated tracks.

The decoding of the data sectors protected by the redundant sectors is exactly the same as the decoding procedure given in the first approach (illustrated in FIGS. 3–5). That is, in the event that there are errors in the sectors protected by the r redundant sectors, the errors can be recovered by an error and erasure sector decoding algorithm which treats the re-written sectors as erasures.

To reduce the number of steps in a Reed-Solomon sector- oriented encoding/decoding operation, large Galois fields are used for the sector-oriented or vertical codes. The use of large fields for increased symbol size is described in detail in U.S. patent application Ser. No. 09/079,757, in the name of Weng and entitled "Encoding Apparatus for Raid-6 Systems and Tape Drives", incorporated herein by reference. As described in that patent application, the non-primitive Reed-Solomon codes can be constructed using roots of the form $x^j$ for $0<j<L$ and the field. The requirements for L are: 1) that L+1 be a prime; and 2) that 2 is a primitive element mod L+1. The elements of a field $GF(2^N)$ may be $\beta^k$ for k=0, 1, ..., $2^N-2$, where $\beta^k$ are not roots of the irreducible polynomial $x^L+x^{L-1}+ \ldots x^2+x+1$. A large Galois field $GF(2^{NL})$ can be constructed as an extension field of $GF(2^N)$ mod $x^L+x^{L-1}+\ldots+x^2+x+1$. A non-primitive Reed-Solomon code over $GF(2^{NL})$ can be constructed whose generator polynomial contains roots of $x^j$. Consequently, the encoding and decoding of this non-primitive Reed-Solomon code can be accomplished by cyclic rotation of (L+1)-tuples over $GF(2^N)$.

It is desirable to select N as the symbol size for the ECC within each sector. In this way, the symbols for sector coding are related to symbols for ECC inside a sector in a simple way. In other words, each sector ECC (i.e., redundant) symbol is formed by using L ECC symbols within a sector.

Therefore, the "vertical coding" as described earlier can use a symbol size different from that used by the "horizontal coding". As stated above, the vertical symbol size may be conveniently selected as L times the horizontal symbol size. The larger the value of L, the fewer times the vertical (or sector) encoding and decoding needs to be performed. Furthermore, for some specific selection of L, the multiplication of the vertical code symbols can be accomplished by cyclic permutations of the horizontal code symbols and the multiplications of horizontal code symbols. For example, a commonly selected symbol size for the horizontal code is N=8. If the value of L is selected as, for example, 10, 12, 19, or 28, the multiplication becomes particularly simple. In these values of L, $x^L+x^{L-1}+x^{L-2}+ \ldots +x^2+x+1$ is an irreducible polynomial over $GF(2^8)$. If this polynomial is used to generate $GF(2^8)^L$, the field elements becomes $a^{L-1}*x^{L-1}+a^{L-2}*x^{L-2}+a^{L-3}*x^{L-3}+ \ldots +a^{2}*x^2+a^{1}*x+a^0$, a polynomial of degree L–1 can be expanded into degree L because $x^L+x^{L-1}+x^{L-2}+ \ldots +x^2 +x+1=0$. Therefore, $a^{L-1}*x^{L-1}+a^{L-2}*x^{L-2}+a^{L-3}*x^{L-3}+ \ldots +a^{2}*x^2+a^{1}*x+a^0 = c*x^L+(c+a^{L-1})*x^{L-1}+ \ldots +(c+a^2)*x^2+(c+a^1)*x+(c+a^0)$. With this extra term $c*x^L$, multiplication becomes much simpler. This can be seen by the observation that $$x^L = x^{L-1}+x^{L-2}+ \ldots +x^2+x+1$$

and $x^{L+1} = x^L+x^{L-1}+x^{L-2}+ \ldots +x^2+x = x^{L-1}+x^{L-2}+ \ldots +x^2+x+1+x^{L-1}+x^{L-2}+ \ldots +x^2+x = 1$ Therefore, $x^{L+j}=x^j$ for any j. Consequently, $(a^L x^L + a^{L-1} x^{L-1} + \ldots + a$ $2x^2+a^1 x+a^0)*$ $(b^L x^L+b^{L-1} x^{L-1}+ \ldots +b$ $2x^2+b^1 x+b$ $0)=a^{0*}(a^L x^L+a^{L-1} x^{L-1}+ \ldots +a$ $2x^2+a^1 x+a$ $0)+a^{1*}(a^{L-1} x^L+a^{L-2} x^{L-1}+ \ldots +a$ $1*2+a^0 x+a$ $L)+a^{2*}(a^{L-2} x^L+a^{L-3} x^{L-1}+ \ldots +a$ $0 2+a^0 x+a$ $L) \ldots +a^{L*}(a^0 x^L+a^L x^{L-1}+ \ldots +a$ $3*2+a^2 x+a^1)$ It will be recognized that the terms inside the parentheses are cyclic rotations of one another. This property does not apply for other irreducible polynomials.

Other Embodiments

It is to be understood that while the invention has been described in conjunction with the detailed description thereof, the foregoing description is intended to illustrate and not limit the scope of the invention, which is defined by the scope of the appended claims. Other embodiments are within the scope of the following claims.

What is claimed is:

1. A method of operating a data storage system which data is stored in data sectors in a data storage area and redundant information that provides error protection for the data is stored in redundant sectors in a redundant storage area, the method comprising:

receiving new data to be written to a designated one of the data sectors, the redundant information not providing error protection for the new data; and selectively storing error correction information for the new data in an additional storage area of the data storage system to provide error protection for the new data instead of revising the redundant information to provide such protection, by determining if the error protection provided by the redundant information is sufficient to enable error correction of data in other data sectors if the redundant information is not revised.

2. The method of claim 1, wherein determining comprises:

determining if the additional storage area has enough capacity to store the error correction information.

3. The method of claim 2, wherein selectively storing comprises:

revising the redundant information if it is determined that the additional storage area does not have enough capacity to store the error correction information.

4. The method of claim 2, wherein the redundant sectors were generated previously by sector encoding, wherein the additional storage area comprises a plurality of additional sectors, and wherein determining if the additional storage area has enough capacity comprises:

determining if the designated data sector has been written since the previous sector encoding operation; and if the designated data sector has not been written since the previous sector encoding, determining how many other ones of the data sectors have been written since the previous sector encoding operation.

5. The method of claim 4, wherein selectively storing further comprises:

if the number of other ones of the data sectors written since the previous sector encoding is less than the number of sectors in the plurality of additional sectors in the additional storage area, then storing the error correction information on an available sector in the additional storage area.

6. The method of claim 5, wherein selectively storing further comprises:

revising the redundant information if the number of other ones of the data sectors written since the previous sector encoding is not less than the number of sectors in the additional storage area.

7. The method of claim 6, wherein revising the redundancy information includes performing a sector encoding of data in the data sectors.

8. The method of claim 7, wherein the redundant sectors have redundant symbols, and wherein corresponding data symbols in the data sectors and associated redundant symbols in the redundant sectors form Reed Solomon code words of k data symbols and r redundant symbols.

9. The method of claim 6, further comprising:

correcting erroneous data in a data sector.

10. The method of claim 9, wherein correcting the erroneous data comprises:

retrieving from the k data sectors and the r redundant sectors, respectively, symbols which correspond to the erroneous data;

producing from the symbols code words which correspond to the erroneous data;

treating as erasures the symbols which are from data sectors that have been written since the previous sector encoding; and manipulating the code words to determine the value of the erroneous data.

11. The method of claim 4, further comprising:

if the designated sector has been involved in a write operation since the previous sector encoding, identifying which one of the sectors in the additional storage area was involved in the previous write operation directed to the designated data sector; and using the identified sector to store the error correction information.

12. The method of claim 11, further comprising:

determining if a write command is being received or processed; and if a write command is not being received or processed, repeating the data sector encoding for each data sector involved in at least one write operation since a previous data sector encoding.

13. The method of claim 1, wherein the error correction information includes error correction code associated with the new data.

14. The method of claim 13, wherein the error correction information further includes a copy of the new data.

15. The method of claim 1, further comprising:

storing a first portion of error correction code associated with the new data in the designated data sector.

16. The method of claim 15, wherein the error correction information includes a remaining second portion error correction code associated with the new data.

17. The method of claim 16, wherein the data sectors each store a Reed Solomon code word of k data symbols and r ECC symbols.

18. The method of claim 16, wherein the number of sectors in the additional storage area is r−2.

19. The method of claim 17, wherein the data sectors each store a Reed Solomon code word of k data symbols and r ECC symbols, the Reed Solomon code word being generated by a symbol encoding of the k data symbols.

20. The method of claim 19, wherein the sector encoding uses a symbol size that is different from the symbol encoding.

21. The method of claim 19, wherein the data sectors reside on data storage devices, each residing on a different one of the data storage devices.

22. The method of claim 20, wherein the redundant sectors reside on redundant storage devices, each residing on a different one of the redundant storage devices.

23. The method of claim 22, wherein the sectors reside in additional storage devices, each residing on a different one of the additional storage devices.

24. The method of claim 23, wherein performing the sector encoding comprises:

retrieving data stored on the designated data sector in a designated one of the data storage devices and in the corresponding data sectors on each of the other data storage devices and encoding the corresponding symbols of the data to form r redundant symbols; and storing the redundant symbols in corresponding redundant sectors on the redundant storage devices.

25. An apparatus for operating a data storage system in which data is stored in data sectors in a data storage area and redundant information for providing error protection for the data is stored in redundant sectors in a redundant storage area, the apparatus comprising:
  a storage system controller for receiving new data to be written to a designated one of the data sectors, the redundant information not providing error protection for the new data; and
  the storage system controller selectively storing error correction information for the new data in an additional storage area of the data storage system to provide error protection for the new data instead of revising the redundant information to provide such protection,
  wherein the storage system controller comprises a processor for determining if the error protection provided by the redundant information is sufficient to enable error correction of data in other data sectors if the redundant information is not revised.

26. The apparatus of claim 25, wherein the storage system controller further comprises a write table and wherein the processor uses the write table to determine if the additional storage area has enough capacity to store the error correction information.

27. The apparatus of claim 26, wherein the processor revises the redundant information if the processor determines that the additional storage area does not have enough capacity to store the error correction information.

28. The apparatus of claim 26, wherein storage system controller further comprises a write controller coupled to the processor, the write controller for writing to the additional storage area, wherein the redundant information was generated previously by sector encoding, and wherein the processor determines from the write table that the designated data sector has not been written since the previous sector encoding and further determines how many other ones of the data sectors have been written since the previous sector encoding; and
  if the number of other ones of the data sectors written since the previous sector encoding is determined to be less than the number of sectors in the additional storage area, then the processor causes the write controller to store the error correction information on an available sector in the additional storage area.

29. The apparatus of claim 28, wherein the storage system controller further comprises a read controller and an encoder, and wherein the processor causes the read and write controller to operate in conjunction with the encoder to revise the redundancy information if the number of other ones of the data sectors written since the previous sector encoding is not less than the number of sectors in the additional storage area.

30. The apparatus of claim 29, wherein the encoder performs a sector encoding of data in the data sectors.

31. The apparatus of claim 30, wherein the redundant sectors have redundant symbols, and wherein corresponding data symbols in the data sectors and associated redundant symbols in the redundant sectors form Reed Solomon code words of k data symbols and r redundant symbols.

32. The apparatus of claim 31, wherein the number of sectors in the additional storage area is r−2.

33. The apparatus of claim 32, wherein the data sectors each store a Reed Solomon code word of k data symbols and r ECC symbols, the Reed Solomon code word being generated by a symbol encoding of the k data symbols.

34. The apparatus of claim 33, wherein the sector encoding uses a symbol size that is different from the symbol encoding.

35. The apparatus of claim 33, wherein the data sectors reside on data storage devices, each residing on a different one of the data storage devices.

36. The apparatus of claim 35, wherein the redundant sectors reside on redundant storage devices, each residing on a different one of the redundant storage devices.

37. The apparatus of claim 36, wherein the sectors reside in additional storage devices, each residing on a different one of the additional storage devices.

38. The apparatus of claim 37, wherein the read controller retrieves data stored on the designated data sector in a designated one of the data storage devices and in the corresponding data sectors on each of the other data storage devices, the encoder encodes the corresponding symbols of the data to form r redundant symbols and the write controller stores the r redundant symbols in corresponding redundant sectors on the redundant storage devices.

39. The apparatus of claim 28, further comprising:
  if the designated sector has been involved in a write operation since the previous sector encoding, the processor identifying which one of the sectors in the additional storage area was involved in the previous write operation directed to the designated data sector and causing the write controller to store the error correction information on the identified sector.

40. The apparatus of claim 39, wherein the processor directs the encoder to encode each data sector involved in at least one write operation since the previous sector encoding if a write command is not being received or processed.

41. The apparatus of claim 30, further comprising a decoder coupled to the processor as well as the data sectors and redundant sectors for correcting data in an erroneous data sector.

42. The apparatus of claim 41, wherein read controller retrieves from the k data sectors and the r redundant sectors, respectively, symbols which correspond to the erroneous data and wherein the decoder produces from the symbols code words which correspond to the erroneous data, treats as erasures the symbols which are from data sectors that have been written since the previous sector encoding and manipulates the code words to determine the value of the erroneous data.

43. The apparatus of claim 25, wherein the error correction information includes error correction code associated with the new data.

44. The apparatus of claim 43, wherein the error correction information further includes a copy of the new data.

45. The apparatus of claim 25, wherein the write controller stores a first portion of error correction code associated with the new data in the designated data sector.

46. The apparatus of claim 45, wherein the error correction information includes a remaining second portion error correction code associated with the new data.

47. The apparatus of claim 46, wherein the data sectors each store a Reed Solomon code word of k data symbols and r ECC symbols.

48. An apparatus for operating a data storage system in which data is stored in data sectors in a data storage area and redundant information for providing error protection for the data is stored in redundant sectors in a redundant storage area, the apparatus comprising:
  a storage system controller for receiving new data to be written to a designated one of the data sectors, the redundant information not providing error protection for the new data; and
  the storage system controller selectively storing error correction information for the new data in an additional storage area of the data storage system to provide error protection for the new data instead of revising the redundant information to provide such protection, wherein the error correction information includes error correction code associated with the new data and a copy of the new data.

49. An apparatus for operating a data storage system in which data is stored in data sectors in a data storage area and redundant information for providing error protection for the data is stored in redundant sectors in a redundant storage area, the apparatus comprising:

a storage system controller for receiving new data to be written to a designated one of the data sectors, the redundant information not providing error protection for the new data; and the storage system controller selectively storing error correction information for the new data in an additional storage area of the data storage system to provide error protection for the new data instead of revising the redundant information to provide such protection, wherein the write controller stores a first portion of error correction code associated with the new data in the designated data sector.

50. The apparatus of claim 49, wherein the error correction information includes a remaining second portion error correction code associated with the new data.

51. The apparatus of claim 50, wherein the data sectors each store a Reed Solomon code word of k data symbols and r ECC symbols.

* * * * *